(12) United States Patent
Misaizu

(10) Patent No.: US 6,594,214 B1
(45) Date of Patent: Jul. 15, 2003

(54) DRIVE APPARATUS AND METHOD FOR RECORDING AND/OR REPRODUCING DATA AND FOR DETECTING A BOUNDARY BETWEEN A RECORDED REGION AND A RECORDABLE REGION ON A RECORDING MEDIUM

(75) Inventor: Tadayuki Misaizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/537,375

(22) Filed: Mar. 29, 2000

(30) Foreign Application Priority Data

Mar. 30, 1999 (JP) ............................ 11-088328

(51) Int. Cl.$^7$ ................................. G11B 7/00
(52) U.S. Cl. ................................. 369/53.11
(58) Field of Search ................. 369/30.04, 30.03, 369/47.45, 84, 47.11, 53.11, 53.12, 59.11; 371/39.1

(56) References Cited

U.S. PATENT DOCUMENTS 5,781,567 A * 7/1998 Sako et al. ............... 714/762
5,896,351 A * 4/1999 Misaizu et al. ......... 369/30.04

* cited by examiner

*Primary Examiner*—Paul W. Huber
*Assistant Examiner*—Kimlien T. Le
(74) *Attorney, Agent, or Firm*—Frommer Lawrence & Haug LLP; William S. Frommer; Darren M. Simon

(57) ABSTRACT

An apparatus and method to detect the boundary between a recorded region and a recordable region. When data is recorded on fixed length packets, with each packet comprised of a plurality of blocks, the boundary is determined by a block in which a reading error has occured and that is located at a position distant from a track head by an integral multiple of the packet length. Alternatively, when the blocks are identifiable from among a plurality of block types, the boundary is determined by using the block type of the eroneous block.

20 Claims, 12 Drawing Sheets

FRAME STRUCTURE

FIG. 12

TOC STRUCTURE (EXAMPLE OF DISC HAVING SIX TRACKS)

| TNO | BLOCK NO. | POINT | PMIN, PSEC, PFRAME | |
|---|---|---|---|---|
| 00 | n | 01 | 00. 02. 32 | START POINT OF TRACK #1 |
|  | n + 1 | 01 | 00. 02. 32 |  |
|  | n + 2 | 01 | 00. 02. 32 |  |
|  | n + 3 | 02 | 10. 15. 12 | START POINT OF TRACK #2 |
|  | n + 4 | 02 | 10. 15. 12 |  |
|  | n + 5 | 02 | 10. 15. 12 |  |
|  | n + 6 | 03 | 16. 28. 63 | START POINT OF TRACK #3 |
|  | n + 7 | 03 | 16. 28. 63 |  |
|  | n + 8 | 03 | 16. 28. 63 |  |
|  | n + 9 | 04 | ⋮ |  |
|  | n + 10 | 04 |  |  |
|  | n + 11 | 04 |  |  |
|  | n + 12 | 05 |  |  |
|  | n + 13 | 05 |  |  |
|  | n + 14 | 05 |  |  |
|  | n + 15 | 06 | 49. 10. 03 | START POINT OF TRACK #6 |
|  | n + 16 | 06 | 49. 10. 03 |  |
|  | n + 17 | 06 | 49. 10. 03 |  |
|  | n + 18 | A0 | 01. 00. 00 | TRACK NUMBER OF FIRST TRACK ON DISC |
|  | n + 19 | A0 | 01. 00. 00 |  |
|  | n + 20 | A0 | 01. 00. 00 |  |
|  | n + 21 | A1 | 06. 00. 00 | TRACK NUMBER OF LAST TRACK ON DISC |
|  | n + 22 | A1 | 06. 00. 00 |  |
|  | n + 23 | A1 | 06. 00. 00 |  |
|  | n + 24 | A2 | 52. 48. 41 | START POINT OF LEAD-OUT TRACKS |
|  | n + 25 | A2 | 52. 48. 41 |  |
| 00 | n + 26 | A2 | 52. 48. 41 |  |
| 00 | n + 27 | 01 | 00. 02. 32 | REPETITION |
|  | n + 28 | 01 | 00. 02. 32 |  |
|  | ⋮ | ⋮ | ⋮ |  |

US 6,594,214 B1

DRIVE APPARATUS AND METHOD FOR RECORDING AND/OR REPRODUCING DATA AND FOR DETECTING A BOUNDARY BETWEEN A RECORDED REGION AND A RECORDABLE REGION ON A RECORDING MEDIUM

BACKGROUND OF THE INVENTION

1. Field of the Invention

The present invention relates to a drive apparatus for a writable recording medium and to a method of detecting the boundary between a recorded region and a recordable region on a recording medium.

2. Description of the Related Art

CD-R (Recordable) and CD-RW (CD-Rewritable) belong to both the CD-type disc and writable recording media families. CD-R is a write-once medium which uses an organic dye in the recording layer and CD-RW is a rewritable medium which uses a phase change technology. A drive apparatus (recording/reproducing apparatus) corresponding to CD-RW can erase recorded data and write new data to the erased region.

A CD-RW drive apparatus can perform data erasure by one of two methods: physical erasure and logical erasure. Physical erasure is a method in which data written on a disc is erased physically, thereby restoring the disc surface to a state where nothing is written. Logical erasure is a method in which particular information is overwritten into a subcode in the data. When read, this information indicates that the recorded data which still exists on the recording medium can be ignored.

When a disc is mounted, the drive apparatus needs to find the end (data end) of the portion of the disc where data is recorded. This data end corresponds to a boundary portion between a recorded region and a recordable region. The recordable region can be either a portion that has not previously been recorded on, a physically erased portion, or a logically erased portion.

When the boundary between a recorded region and a recordable region is found, the drive apparatus reports that fact to a host apparatus (e.g., a personal computer). Once a host apparatus recognizes a position (address) as a boundary on the disc, new data can be written to the disc starting from the boundary.

For example, assume that a certain data track was recorded on a disc as shown in FIG. 13(a) and logically erased as shown in FIG. 13(b), and that a new data track was thereafter recorded in the logically erased region as shown in FIG. 13(c). If the disc in the state of FIG. 13(c) is mounted in a drive apparatus, the drive apparatus detects the boundary shown in FIG. 13(c) and reports that fact to the host apparatus, whereby new data can be recorded in the region following the current data end.

However, correct detection cannot be performed when a logically erased region has not been re-recorded.

As shown in FIG. 14(a), a data end is a boundary between a recorded region and a region that has not previously been subjected to recording or is a physically erased region. To detect the boundary location, a drive apparatus performs a reproducing operation over the recorded region of a disc. An RF signal is returned from those regions which are recorded. Therefore, the boundary location is the position starting where no reproduction RF signal is returned.

However, in the case where, as shown in FIG. 14(b), a data end is a boundary with a logically erased region, this technique cannot be used to determine the boundary. This is because the data still exists in the logically erased region and hence a reproduction RF signal is returned by that region.

Because of this problem, the boundary with a logically erased region is normally determined using a subcode CRC error check.

As described later in detail, CD-RW data is written on a packet-by-packet basis and each packet is formed by a plurality of blocks. The head block of each packet is designated a link block. A link block is formed after the last packet in a packet-by-packet recording operation. FIG. 14(c) is an enlarged version of the boundary portion shown in FIG. 14(b) that is formed by such a recording operation. Each block is denoted as BL(n), BL(n−1), . . .

A block which contains the write end point is made a link block. This link block, (i.e., a block where a physical writing operation was finished) includes logically erased data as shown in FIG. 14(c). Therefore, a subcode CRC check on this block necessarily results in an error.

Based on this fact, the drive apparatus performs a reproducing operation on a recorded region and determines in which blocks CRC errors occur. This makes it possible to detect, for example, block BL(n) shown in FIG. 14(c) as a boundary. However, this method of detection requires that no CRC errors occur in other blocks.

If for some reason such as a stain on the disc or data deterioration due to repetition of recording operations, a CRC error occurs at a block that is not a boundary, the drive apparatus may erroneously detect a boundary or fail to identify a boundary. For example, if a CRC error occurs at a non-boundary block such as block BL(n−1) in addition to block BL(n) shown in FIG. 14(c), it cannot be determined which block is a true boundary. Since a boundary cannot be correctly detected in this manner, the reliability of the apparatus is lowered.

OBJECTS OF THE INVENTION

In view of the above problem, an object of the present invention is to correctly detect the boundary between a recorded region and a recordable region on a recording medium in a drive apparatus.

Still other objects and advantages of the invention will in part be obvious and will in part be apparent from the specification and the drawings.

SUMMARY OF THE INVENTION

To attain the above objective, the invention provides a drive apparatus capable of recording or reproducing data on or from a recording medium in which each packet is formed by a plurality of blocks and on which data recording is performed on a packet-by-packet basis, the drive apparatus comprising a boundary detector for performing data reading on the recording medium in a state that data is recorded on the recording medium in the form of one or a plurality of packets having a particular packet length, and for determining a block where a reading error has occurred and that is located at a position distant from a track head by an integral multiple of the particular packet length as a boundary between a data-recorded region and a writable region. Thus, the invention makes it possible to correctly detect a boundary by using the fixed packet length in addition to detected reading errors as detection criteria.

The invention also provides a drive apparatus capable of recording or reproducing data on or from a recording medium on which data recording is performed on a packetby-packet basis, each packet being prescribed so as to be formed by a plurality of blocks and include a particular type of block at least as an end block, the drive apparatus comprising a boundary detector for performing data reading on the recording medium in a state that data is recorded on the recording medium in the form of one or a plurality of packets, and for determining a boundary between a data-recorded region and a writable region by using a block reading error state and a block type as criteria. Thus, the invention makes it possible to correctly detect a boundary by using a block's type in addition to a detected reading error as detection criteria.

BRIEF DESCRIPTION OF THE DRAWINGS

For a more complete understanding of the invention, reference is made to the following description and accompanying drawings(s), in which:

FIG. 12 is an explanatory diagram of the TOC structure of CD-RW;

DETAILED DESCRIPTION OF PREFERRED EMBODIMENTS

A drive apparatus corresponding to CD-RW according to an embodiment of the present invention is hereinafter described. The description is made with reference to the accompanying drawings and in the following order: 1) configuration of the drive apparatus; 2) CD-RW data structure; 3) TOC and subcode; and 4) boundary judging operation.

The configuration of the drive apparatus according to this embodiment which can record and reproduce data on and from a CD-RW disc will be described with reference to FIG. 1.

Figure 1:
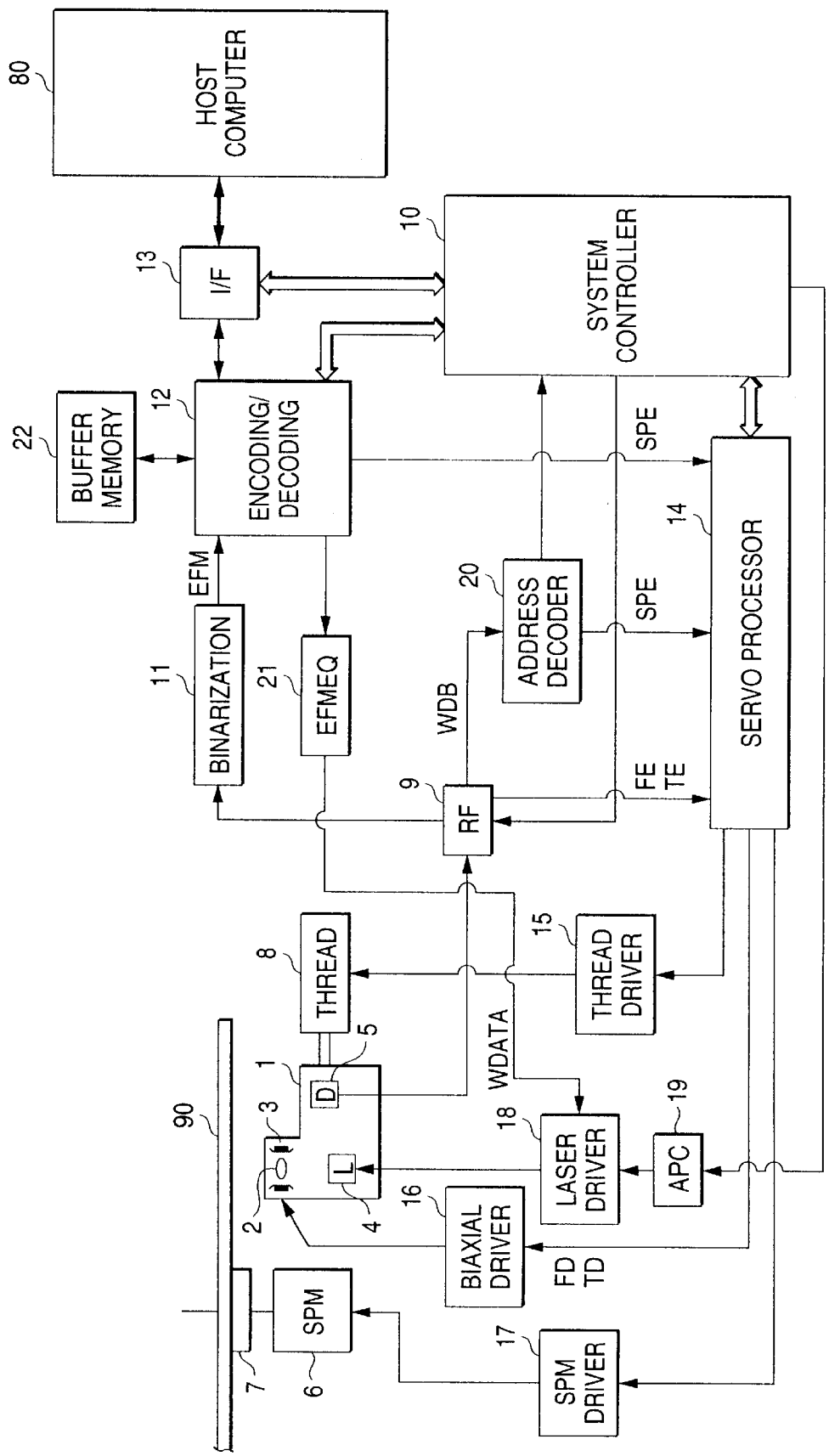
FIG. 1 is a block diagram of a drive apparatus according to an embodiment of the present invention.

In FIG. 1, a CD-RW disc 90 is mounted on a turn table 7 and rotationally driven at a constant linear velocity (CLV) or a constant angular velocity (CAV) by a spindle motor 6 in a recording or reproducing operation. Data that is recorded on the disc 90 in the form of embossed pits or phase change pits is read out by a pickup 1. Usually, a drive apparatus corresponding to CD-RW can reproduce such discs as CD-R and CD-ROM discs.

The pickup 1 incorporates a laser diode 4 as a laser light source, a photodetector 5 for detecting reflection light, an objective lens 2 as a laser light output end, and an optical system for applying laser light to the disc recording surface via the objective lens 2 and guiding resulting reflection light to the photodetector 5. The objective lens 2 is held by a biaxial mechanism 3 so as to be movable in the tracking direction and the focusing direction. The entire pickup 1 is made movable in the disc radial direction by a thread mechanism 8. The laser diode 4 in the pickup 1 is driven by a laser driver 18 so as to emit laser light.

Reflected light coming from the disk 90 is detected by the photodetector 5, converted into an electrical signal corresponding to the quantity of received light, and is supplied to an RF amplifier 9.

The RF amplifier 9 is provided with current-voltage conversion circuits and matrix calculation/amplification circuits to convert output currents from a plurality of photo-detecting elements, such as the photodetector 5, and generate necessary signals by performing matrix calculations. For example, the RF amplifier 9 generates an RF signal for reproduced data, a focusing error signal FE and a tracking error signal TE for servo controls. The reproduction RF signal that is output from the RF amplifier 9 is supplied to a binarization circuit 11, and the focusing error signal FE and the tracking error signal TE are supplied to a servo processor 14.

The CD-RW disc 90 is formed in advance with a groove as a guide for recording tracks. The groove is wobbled (snaked) according to a signal obtained by frequency-modulating time information in a manner indicating absolute addresses on the disc. Therefore, in a recording operation, tracking can be performed based on the groove information and absolute addresses can be obtained based on the wobble information of the groove. The RF amplifier 9 extracts the wobble information WOB by performing a matrix calculation and supplies it to an address decoder 20. The address decoder 20 obtains absolute address information by demodulating the received wobble information WOB and supplies it to a system controller 10.

Further, the address decoder 20 produces rotation speed information of the spindle motor 6 by applying groove information to a PLL circuit, and generates and outputs a spindle error signal SPE by comparing the rotation speed information with reference speed information.

The reproduction RF signal obtained by the RF amplifier 9 is converted into what is called an EFM signal (8–14 modulation signal) by binarizing it in the binarization circuit 11. The EFM signal is supplied to an encoding/decoding section 12. The encoding/decoding section 12 has a functional part serving as a decoder during reproduction and a recording part serving as an encoder during recording. During reproduction, the encoding/decoding section 12 performs a decoding operation, EFM demodulation, CIRC error correction, deinterleaving, CD-ROM decoding, and other operations. Thereby reproducing recorded data and converting it into CD-ROM format.

The encoding/decoding section 12 also performs a subcode extracting operation (described later) on data that is read out from the disc 90, and supplies TOC information as a subcode (Q data, address information, etc . . . ) to the system controller 10.

Further, the encoding/decoding section 12 generates, through a PLL operation, a reproduction clock signal that is synchronized with the EFM signal and performs the above decoding operation based on the reproduction clock signal. The encoding/decoding section 12 can generate and output a spindle error signal SPE by obtaining rotation speed information of the spindle motor 6 from the reproduction clock signal and comparing it with reference speed information.

During reproduction, the encoding/decoding section 12 accumulates data that is decoded in the above manner in a buffer memory 22. Data being buffered by the buffer memory 22 can be read out therefrom.

An interface section 13 is connected to an external host computer 80 and communicates recording data, reproduction data, various commands, etc. with the host computer 80. The interface section 13 is generally a SCSI interface, an ATAPI interface, or the like. During reproduction, reproduction data that is decoded and stored in the buffer memory 22 is transferred and output to the host computer 80 via the interface section 13. Read commands, write commands, and other signals coming from the host computer 80 are supplied to the system controller 10 via the interface section 13. Conversely, during recording, data to be recorded (audio data or CD-ROM data) is transferred from the host computer 80 to the buffer memory 22 via the interface section 13 and buffered by the buffer memory 22.

The encoding/decoding section 12 performs, as an operation of encoding the buffered recording data, encoding of CD-ROM format data into CD format data (in the case where the received data is CD-ROM data), CIRC encoding and interleaving, subcode addition, EFM modulation, etc. . . .

An EFM signal obtained by the encoding operation of the encoding/decoding section 12 is subjected to an operation called write equalization in an equalizer 21, and the resulting signal is supplied to the laser driver 18 as write data WDATA and written to the disc. Specifically, phase change pits corresponding to the write data WDATA are formed on the disc 90 by the laser driver 18 modulating the laser diode 4 emission according to the write data WDATA.

An APC (auto power control) circuit 19 is a circuit section for controlling the laser output so that it is kept constant irrespective of the temperature. Given a laser output target value from the system controller 10, the APC circuit 19 monitors the laser output power and controls the laser driver 18 so that the laser output level is kept equal to the target value.

The servo processor 14 performs servo operations by generating various servo drive signals, that is, focusing, tracking, thread, and spindle drive signals, based on a focusing error signal FE and a tracking error signal TE supplied from the RF amplifier 9, a spindle error signal SPE supplied from the encoding/decoding section 12 or the address decoder 20, and other signals.

The servo processor 14 generates a focusing drive signal FD and a tracking drive signal TD based on the focusing error signal FE and the tracking error signal TE and supplies those to a biaxial driver 16. The biaxial driver 16 drives the focusing coil and the tracking coil of the biaxial mechanism 3 of the pickup 1. In this manner, a tracking servo loop and a focusing servo loop are formed by the pickup 1, the RF amplifier 9, the servo processor 14, the biaxial driver 16, and the biaxial mechanism 3.

Further, the servo processor 14 supplies a spindle motor driver 17 with a spindle drive signal that is generated based on the spindle error signal SPE. The spindle motor driver 17 applies a three-phase drive signal, for example, to the spindle motor 6 based on the spindle drive signal and thereby causes CLV rotation of the spindle motor 6. Further, the servo processor 14 generates a spindle drive signal based on a spindle kick/brake control signal coming from the system controller 10 and thereby causes the spindle motor driver 17 to perform activation, stop, acceleration, deceleration, etc. on the spindle motor 6.

The servo processor 14 also generates a thread drive signal based on a thread error signal that is obtained as a low-frequency component of the tracking error signal TE, an access execution control by the system controller 10, or the like, and supplies the generated thread drive signal to a thread driver 15. The thread driver 15 drives the thread mechanism 8 based on the thread drive signal. Having a mechanism (not shown) including a main shaft that supports the pickup 1, a thread motor, and transmission gears, the thread mechanism 8 causes the pickup 1 to perform a necessary slide movement in such a manner that the thread driver 15 drives the thread motor 8 based on the thread drive signal.

The operations of the servo system and the recording/reproducing system are controlled by the system controller 10 that is a microcomputer. The system controller 10 executes various processes in response to commands coming from the host computer 80.

For example, when the system controller 10 receives from the host computer 80, a read command requesting a transfer of data recorded on the disc 90, a seek operation is first performed with a specified address as a target. By supplying an instruction to the servo processor 14, the system controller 10 causes the pickup 1 to perform an access operation in which an address specified by a seek command is targeted. The system controller 10 then controls the transfer of data from the specified data section to the host computer 80 by causing the data to be read from the disc 90, decoded, buffered, etc . . . .

When a write command is output from the host computer 80, the system controller 10 causes the pickup 1 to be moved to an address where the writing is to be performed. Then, as described above, the system controller 10 causes the encoding/decoding section 12 to encode the transferred data, thereby converting it into an EFM signal.

Recording is performed by supplying the write data WDATA that has been equalized in the above manner to the laser driver 18.

Figure 5:
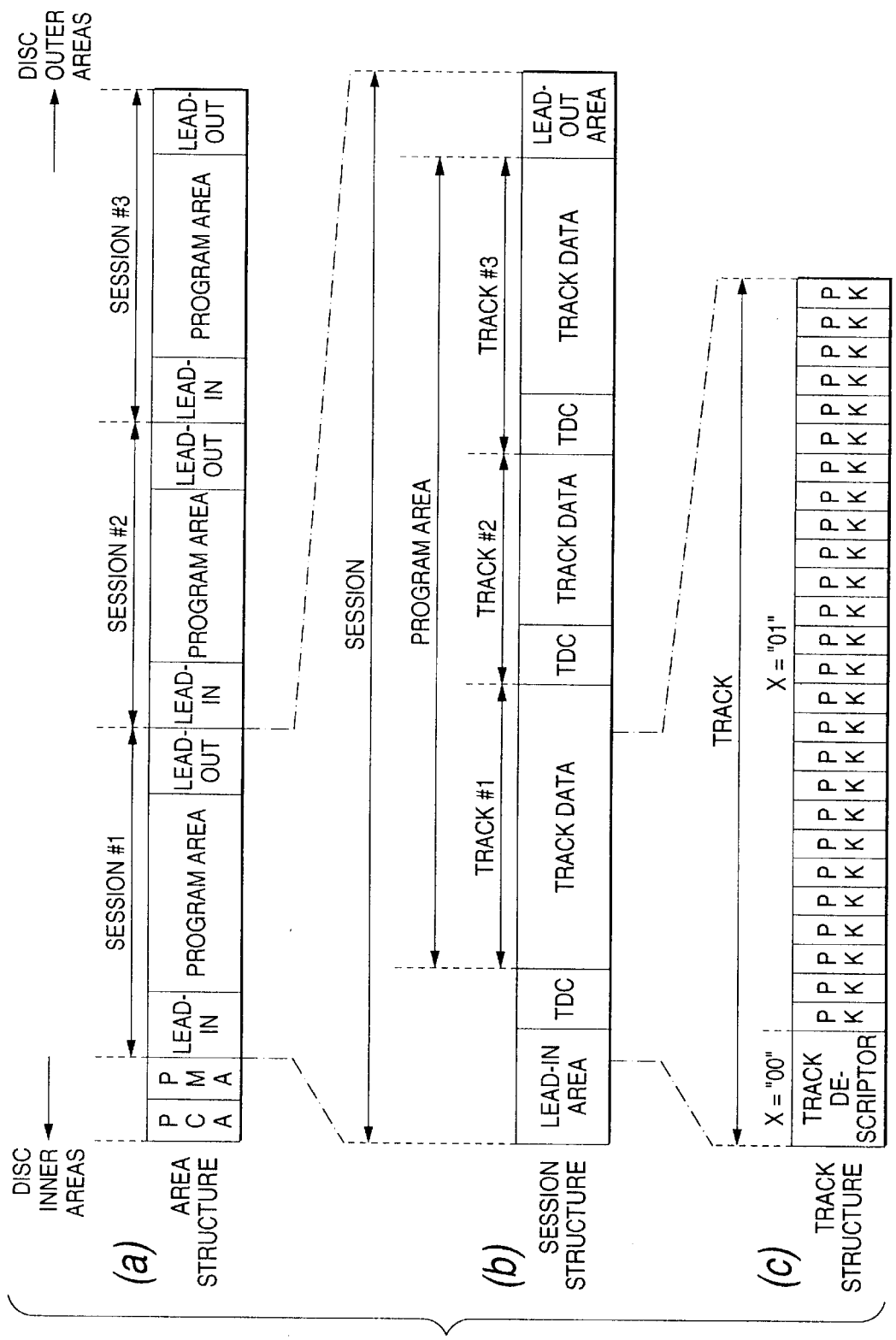
FIG. 5 is an explanatory diagram of the data structure of CD-RW.
Figure 6:
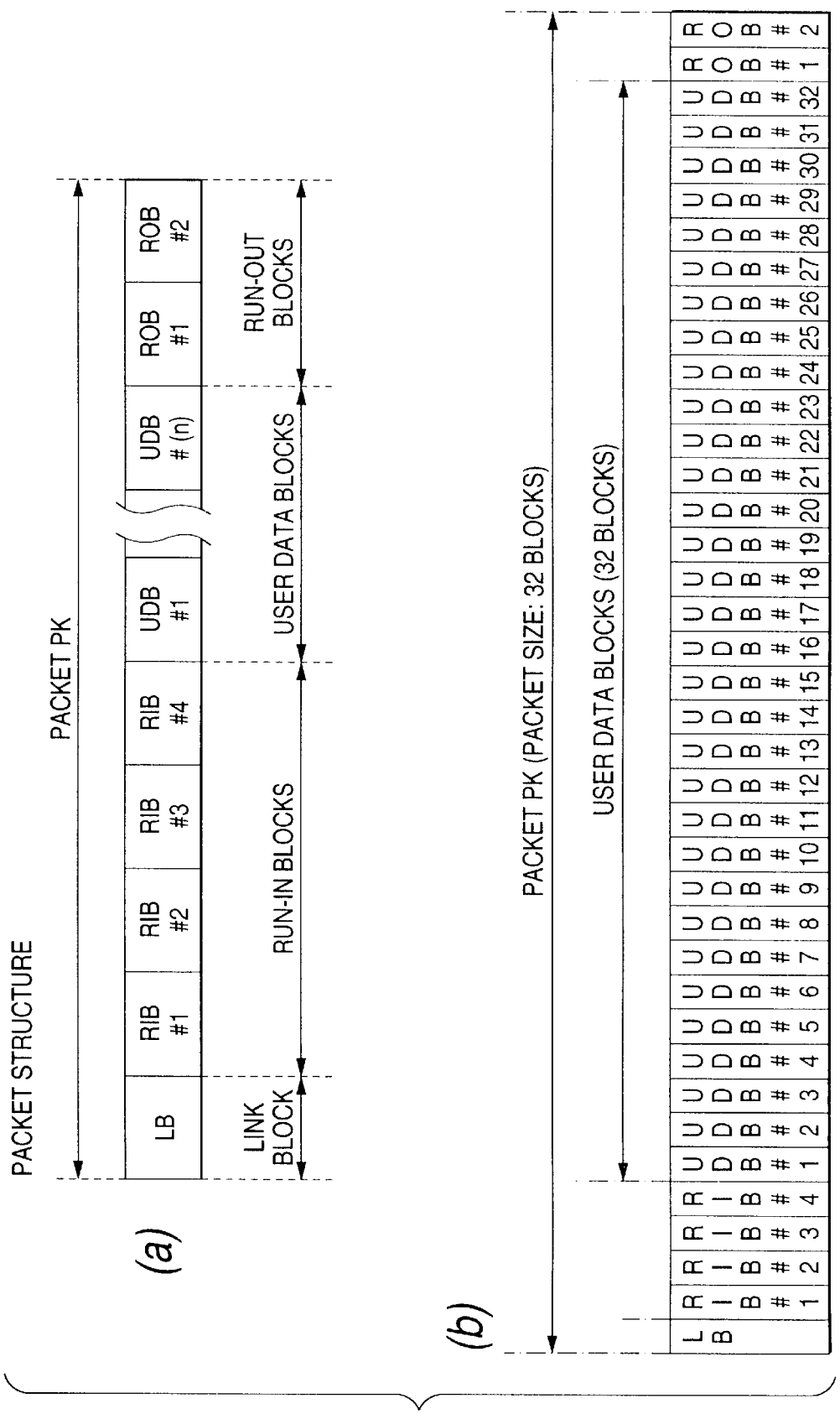
FIG. 6 is an explanatory diagram of the packet structure of CD-RW.

Next, the CD-RW data structure will be described with reference to FIGS. 5–7. FIG. 5(a) shows the inner-to-outer-area layout of the CD-RW disc. Areas called PCA (power calibration area) and PMA (program memory area) are formed as innermost areas of the disc. These areas are used in only drive apparatus corresponding to CD-RW (usual CD-ROM drives cannot access these areas.)

The PCA is an area that is used to determine laser output necessary for recording. That is, a drive apparatus determines the laser output that provides an optimum recording state by writing dummy data to the PCA area while changing the laser output and then checking how the pits were formed by reproducing the dummy-data-written portion.

The PMA is an area in which temporary TOC information can be copied while recording. Disc content information is recorded in the TOC area of a CD. The entire contents of the disc should be determined before recording TOC information. However, in a CD-RW disc capable of additive recording, the entire contents of the disc cannot be determined when more data might be added later. To cope with this, the PMA is used to temporarily store TOC information. When it is determined that no additional data will be recorded, the information in the PMA is copied to the TOC area.

In a CD-RW disc, a recording area can be set in a divisional manner as a plurality of sessions as shown in FIG. 5(a). Each session is formed by a lead-in area where TOC information is written, a program area for recording main data, and a lead-out area.

FIG. 5(b) shows the structure of each session. As shown, the head of each session is a lead-in area where TOC information (management information) for tracks to be recorded in the program area of the session is recorded. One or a plurality of tracks are recorded in each program area as exemplified by track #1, track #2, and track #3. A Is track descriptor TDC is formed in the head portion of each track, and a track data recording area follows the head portion.

FIG. 5(c) shows the structure of one track. The track descriptor portion is a portion where index X of subcode Q data (described later) is "00". Various kinds of management information relating to the track are recorded in the track descriptor. The portion in which index X is "0" (or a value greater than "01") is an actual track data portion.

As shown, track data is formed by one or a plurality of packets PK. The packet PK is a minimum unit of a recording operation. The length of the packet PK may be fixed (fixed packets) or variable (variable packets). Information such as whether the packets PK of a track concerned are fixed packets or variable packets and the packet length (in the case of fixed packets) is described in the track descriptor.

FIG. 6(a) shows the structure of the packet PK. A packet is formed by a plurality of blocks (data unit of 2,352 bytes). As shown, a link block LB and four run-in blocks (RIB #1 to RIB #4), are provided in the head portion and one or a plurality of user data blocks UDB (UDB #1 to UDB #(n)) follow. The user data blocks UDB are blocks where main data is actually recorded. Two run-out blocks (ROB #1 and ROB #2) are provided in the end portion of the packet PK.

For example, where the number of user data blocks (i.e., packet size; in this example, the packet size is the number of user data blocks rather than the number of all blocks of the packet) is 32, the packet PK consists of 39 blocks in total because one link block LB and four run-in blocks (RIB #1 to RIB #4) are provided on the front side of 32 user data blocks UDB #1 to UDB #32 and two run-out blocks (ROB #1 and ROB #2) are provided after the user data blocks UDB #1 to UDB #32 as shown in FIG. 6(b). Where the packet size is 32 and the packets are fixed packets, every packet PK shown in FIG. 5(c) has the structure of FIG. 6(b).

Figure 14:
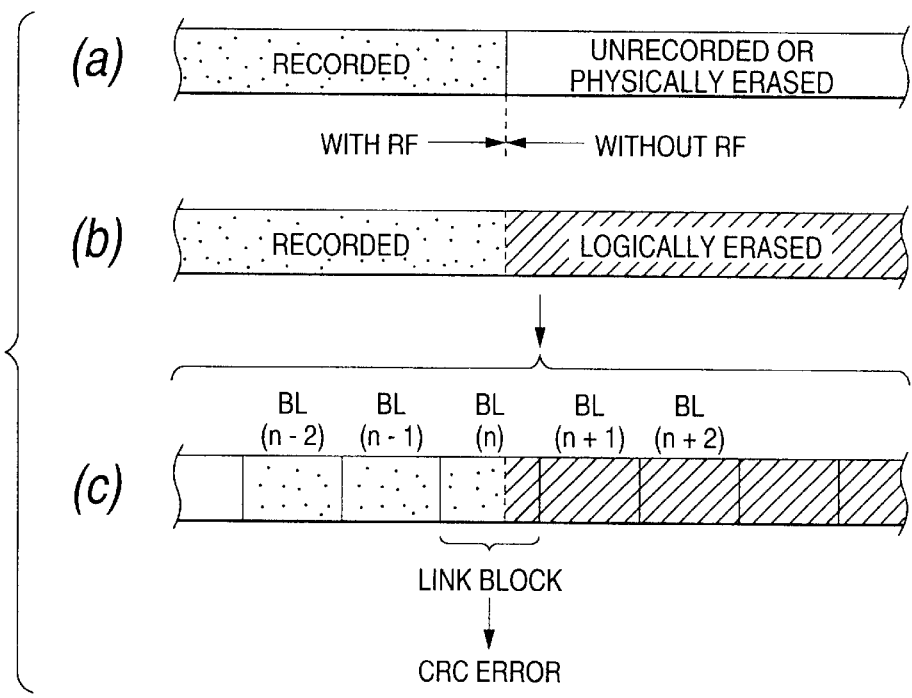
FIG. 14 is an explanatory diagram of a boundary detecting operation.

Recording is performed on a packet-by-packet basis, each packet having the above structure. A recording operation is finished by forming a link block after the last block (i.e., run-out block ROB #2) of the last packet. Therefore, as described above with reference to FIG. 14, when data has been recorded in a logically erased portion, the link block including its boundary includes data that was logically erased.

Figure 7:
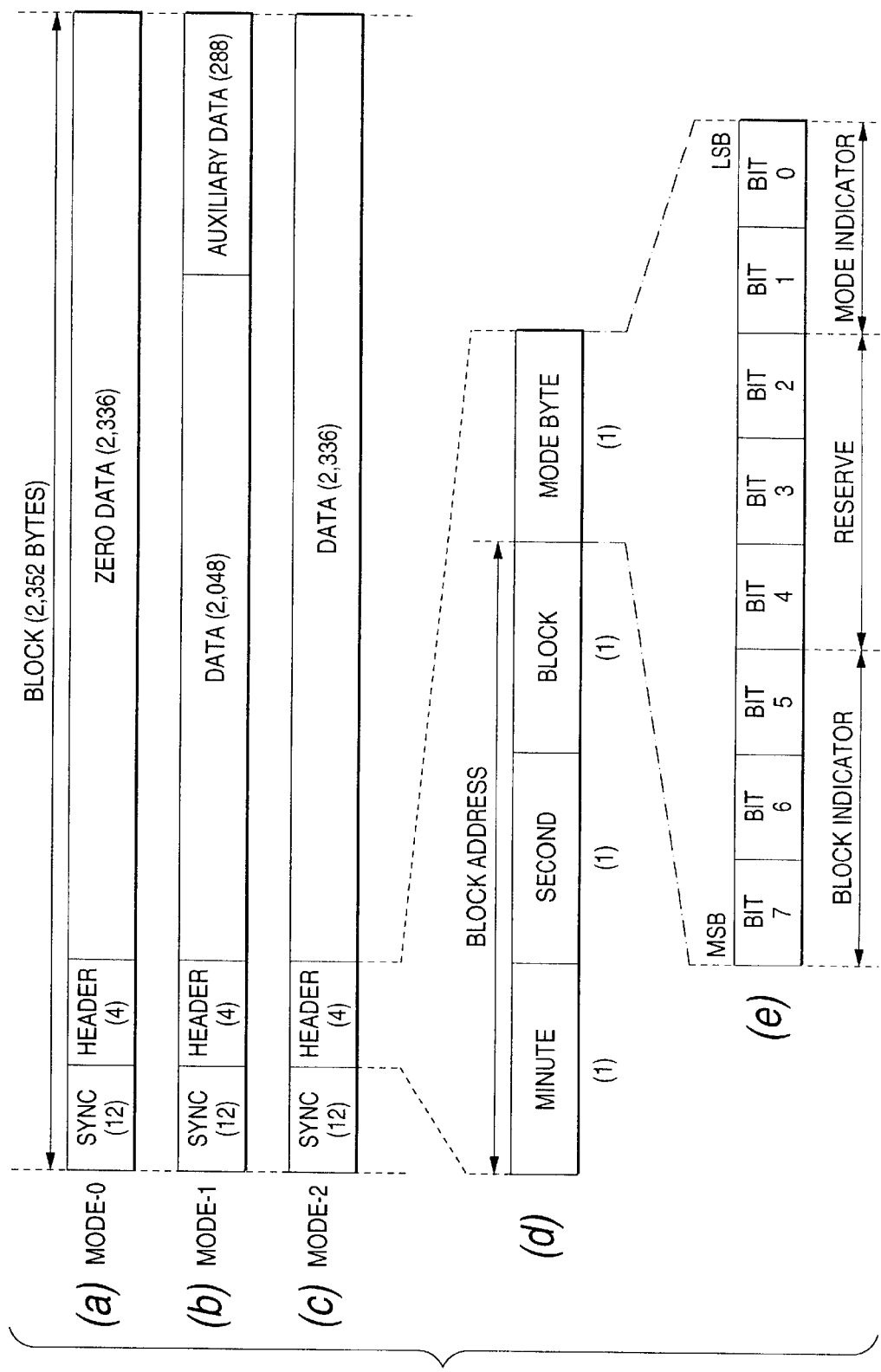
FIG. 7 is an explanatory diagram of the block structure of CD-RW.

FIG. 7 shows the block structure. A block consists of 2,352 bytes. In the CDROM format, each block is assigned a mode (e.g., mode-0, mode-1, and mode-2). For each mode, the head 12 bytes are assigned to a sync pattern and the next four bytes are assigned to a header. In mode-0 shown in FIG. 7(a), the remaining 2,336 bytes are made zero data. A mode-0 block is when no actual data is recorded in a block, such as in TOC areas.

In mode-1 shown in FIG. 7(b), a 2,048-byte data area and a 288-byte auxiliary data area follow the header. In Mode-1 error correcting codes can be added as auxiliary data, thereby increasing the error correction ability.

In mode-2 shown in FIG. 7(c), all of 2,336 bytes following the header are assigned to a data area. Therefore, mode-2 can increase the data recording capacity.

Each of the four bytes of the header is set as shown in FIG. 7(d). Specifically, three bytes are used to indicate the address of the block in the format of minute/second/block. The remaining byte is a mode byte, whose bits (bit-7 to bit-0) are defined as shown in FIG. 7(e). Bit-1 and bit-0 are assigned to a mode indicator where a value indicating one of the above-described block structure modes, that is, mode-0, mode-1, or mode-2, is described.

The block structure mode is mode-0 if bit-1 and bit-0 are "00", it is mode-1 if they are "01", it is mode-2 if they are "10", and it is reserved if they are "11".

Bit-7 to bit-5 are assigned to a block indicator that indicates one of the block types of the above-described packet structure. The correspondence between the block types and the values of bit-7 to bit-5 are defined as follows:

"000" . . . User data block
"001" . . . Run-in block #4
"010" . . . Run-in block #3
"011" . . . Run-in block #2
"100" . . . Run-in block #1
"101" . . . Link block
"110" . . . "Run-out block #2
"111" . . . "Run-out block #1

Therefore, the block type of each block can be judged by reading the header.

Next, the TOC information and the subcode that are recorded on the disc 90 (CDRW) are described. In the CD-type disc, the minimum unit of data is one frame. One subcoding frame comprises 98 frames.

Figure 8:
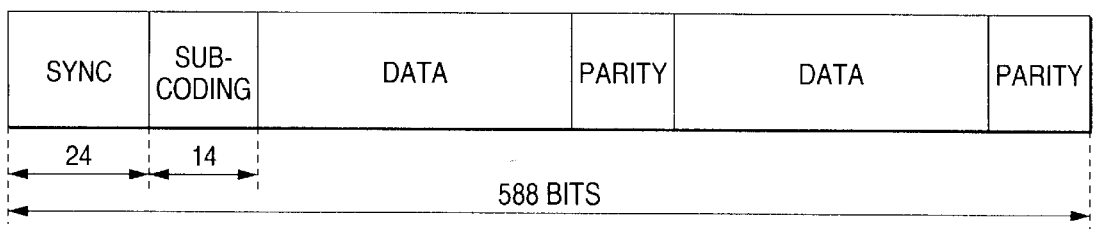
FIG. 8 is an explanatory diagram of the frame structure of CD-RW.

FIG. 8 shows the structure of one frame. Each frame is 588 bits. The head 24 bits are assigned to sync data and the next 14 bits are assigned to a subcode data area, which is followed by data and parity bits.

Figure 9:
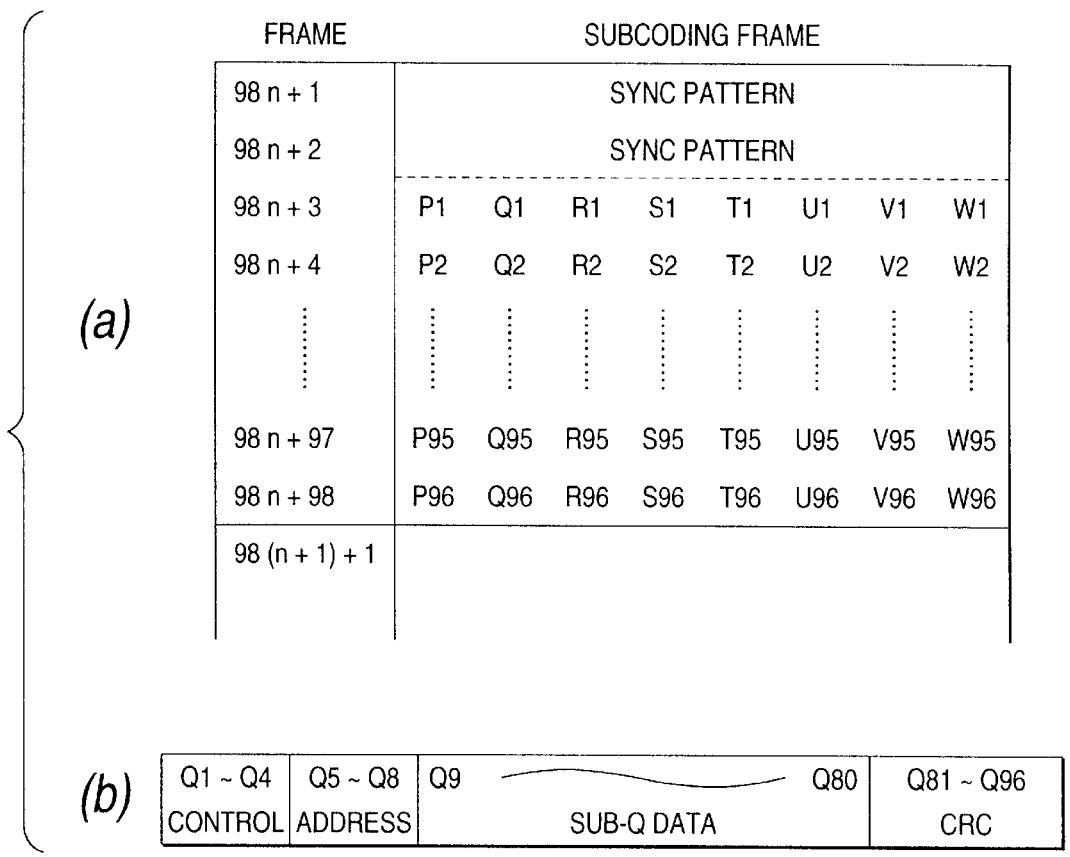
FIG. 9 is an explanatory diagram of subcoding of CD-RW.

Subcode data as shown in FIG. 9(a) is formed by collecting subcode data that is taken from 98 respective frames each having the above structure. This subcode data unit corresponds to the above-described block unit. That is, one unit of subcode data as shown in FIG. 9(a) is obtained for each block as described above. Subcode data taken from the two head frames (frame 98n+1 and frame 98n+2) of the 98 frames is used for sync patterns. Subcode data taken from the third to 98th frames (frame 98n+3 to frame 98n+98), is P, Q, R, S. T, U, V, and W channel data each expressed by 96 bits. P channel and Q channel are used for access management. The P channel indicates a pause between tracks, and finer controls are performed by the Q channel (Q1 to Q96).

The 96-bit Q channel data is formed as shown in FIG. 9(b). The first four bits (Q1 to Q4) are control data and indicate the number of audio channels, an emphasis type, and a CD-ROM type, etc . . . Specifically, the 4-bit control data is defined as follows:

"00*" . . . 2-channel audio, without pre-emphasis
"10*" . . . 4-channel audio, without pre-emphasis
"00*1" . . . 2-channel audio, with pre-emphasis
"10*1" . . . 4-channel audio, with pre-emphasis
"01*0" . . . Data track (non-audio)

"**0*" . . . Digital copying impossible
"**1*" . . . Digital copying possible

The next four bits (Q5 to Q8) are an address ADR, that is, control bits of sub-Q data. A 4-bit address ADR of "0001" indicates that the following sub-Q data of bits Q9 to Q80 is audio Q data. In a logically erased area, the address ADR is made "0000". Bits Q9 to Q80 form 72-bit sub-Q data and the remaining bits Q81 to Q96 are made CRC bits.

Figure 10:
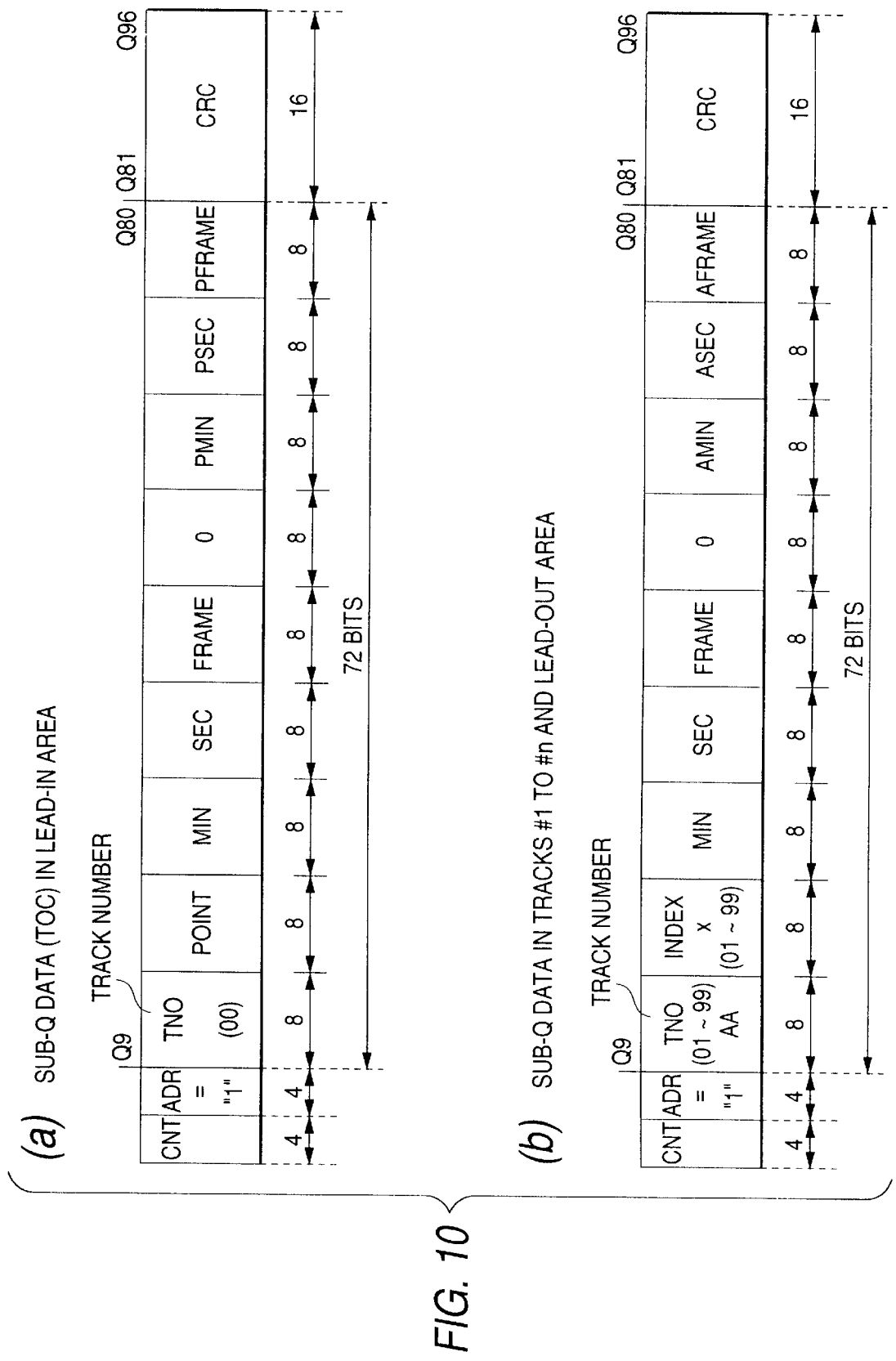
FIG. 10 is an explanatory diagram of sub-Q data of CD-RW.

Sub-Q data recorded in the lead-in area is TOC information. That is, the sub-Q data of 96-bit Q channel data Q1 to Q96 that is read from a lead-in area has information as shown in FIG. 10(a). When the address ADR is set to "0001", bits Q9 to Q80 are used to store a track number followed by 8-bit data. In the lead-in area, the track number is fixed at "00".

Values for POINT, MIN (minute), SEC (second), and FRAME (frame number) are recorded next and indicate elapsed time in the track. Further, PMIN, PSEC, and PFRAME are recorded as determined in accordance with the value of POINT.

If the value of POINT is one of "01" to "99", which means a track number, the start point (absolute time address) of a track having that track number is recorded in the form of a minute (PMIN), a second (PSEC), and a frame number (PFRAME). If the value of POINT is "A0", the track number of the first track is recorded in PMIN. If the value of POINT is "A1", the track number of the last track is recorded in PMIN. If the value of POINT is "A2", the start point of the lead-out area is indicated in PMIN, PSEC, and PFRAME in the form of an absolute time address.

For example, in the case of a disc (or a session described above with reference to FIG. 5) on which six tracks are recorded, TOC data in the form of sub-Q data is recorded. As shown in FIG. 12, all track numbers TNO are "00". The block number is the number of 1-unit sub-Q data that is read as 98-frame block data in the above-described manner. The same TOC data is written over three blocks.

As shown, if POINT is one of "01" to "06", the start point of each of track #1 to track #6 is indicated by PMIN, PSEC, and PFRAME. If POINT is "A0", PMIN is made "01" to mean the first track number. The track number of the last track is recorded in PMIN at positions where the value of POINT is "A1", and the start point of the lead-out area is indicated by PMIN, PSEC, and PFAME at positions where the value of POINT is "A2".

The contents of blocks n to n+26 are repeatedly recorded for block n+27 onward.

In tracks #1 to #n where data is recorded on the disc 1 and in the lead-out area, sub-Q data recorded therein has information as shown in FIG. 10(b) with the address ADR set to "0001". A track number is recorded in the first part of the sub-Q data Q9 to Q80. That is, each of tracks #1 to #n has one of values "01" to "99". In the lead-out area, the track number is made "AA".

Next, information indicating that each track can be subdivided is recorded as an index X. As mentioned above with reference to FIG. 5(c), the index X is "00" in the track descriptor portion and is another value in the track data portion.

Elapsed time in the track is indicated by MIN (minute), SEC (second), and FRAME (frame number). Further, an absolute time address is recorded in the form of a minute (AMIN), a second (ASEC), and a frame number (AFRAME).

The TOC data and the subcode are formed in the above-described manner. It is understood that the address on the disc, that is, AMIN, ASEC, and AFRAME, is recorded on a 98-frame basis. The 98 frames (one block) are called one subcoding frame, and 75 subcoding frames are included in one second of audio data. Therefore, "AFRAME" as part of the absolute address can have values "0" to "74".

Figure 11:
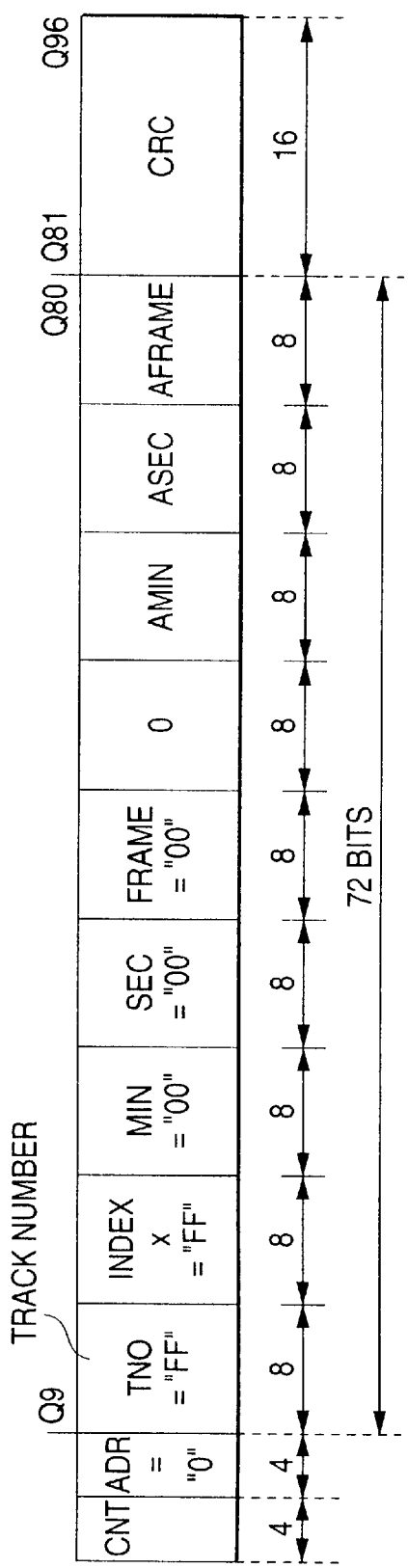
FIG. 11 is an explanatory diagram of sub-Q data of a logically erased portion of CD-RW.
Figure 13:
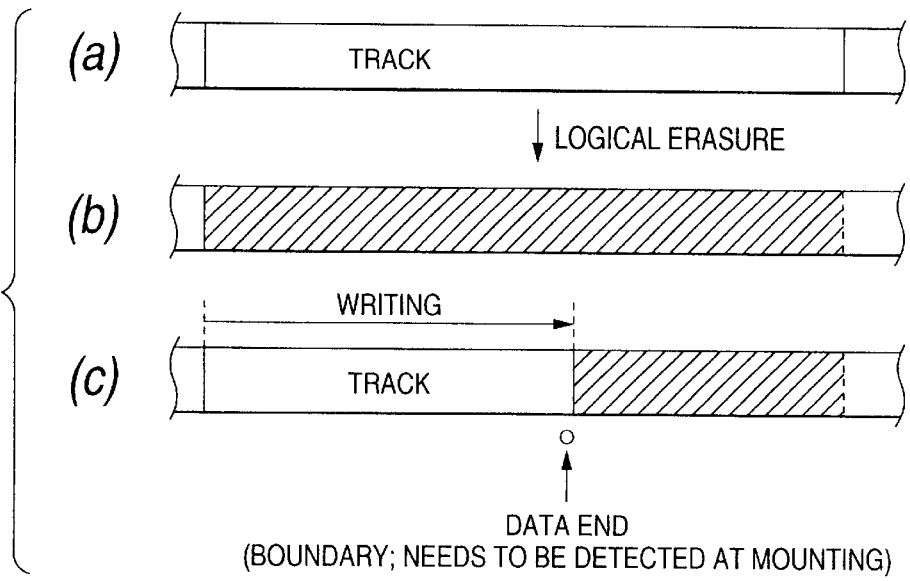
FIG. 13 is an explanatory diagram of a logically erased boundary portion.

In a logically erased portion, the sub-Q data has a structure as shown in FIG. 11. First, the address ADR is made "0000" to indicate that the portion concerned is a logically erased portion. The sub-Q data Q9 to Q80 includes a track number TNO and an index X that is "FF". MIN (minute), SEC (second), and FRAME (frame number) that indicate an elapsed time in the track are each made "00". AMIN, ASEC, and AFRAME are used to record an absolute time address.

The drive apparatus according to this embodiment has a feature wherein the boundary can be correctly determined even for a disc 90 having a boundary between a recorded portion and a logically erased portion (a case described above with reference to FIG. 14).

Since a subcode CRC error necessarily occurs in a link block at a boundary, blocks where subcode data CRC errors occur are searched for. The drive apparatus according to this embodiment can correctly determine a block as a boundary even where a CRC error occurs in a block other than the link block as a boundary. One of the two boundary detection methods, either as shown in FIG. 2 or FIG. 3, is used as a method for the boundary determination.

Figure 2:
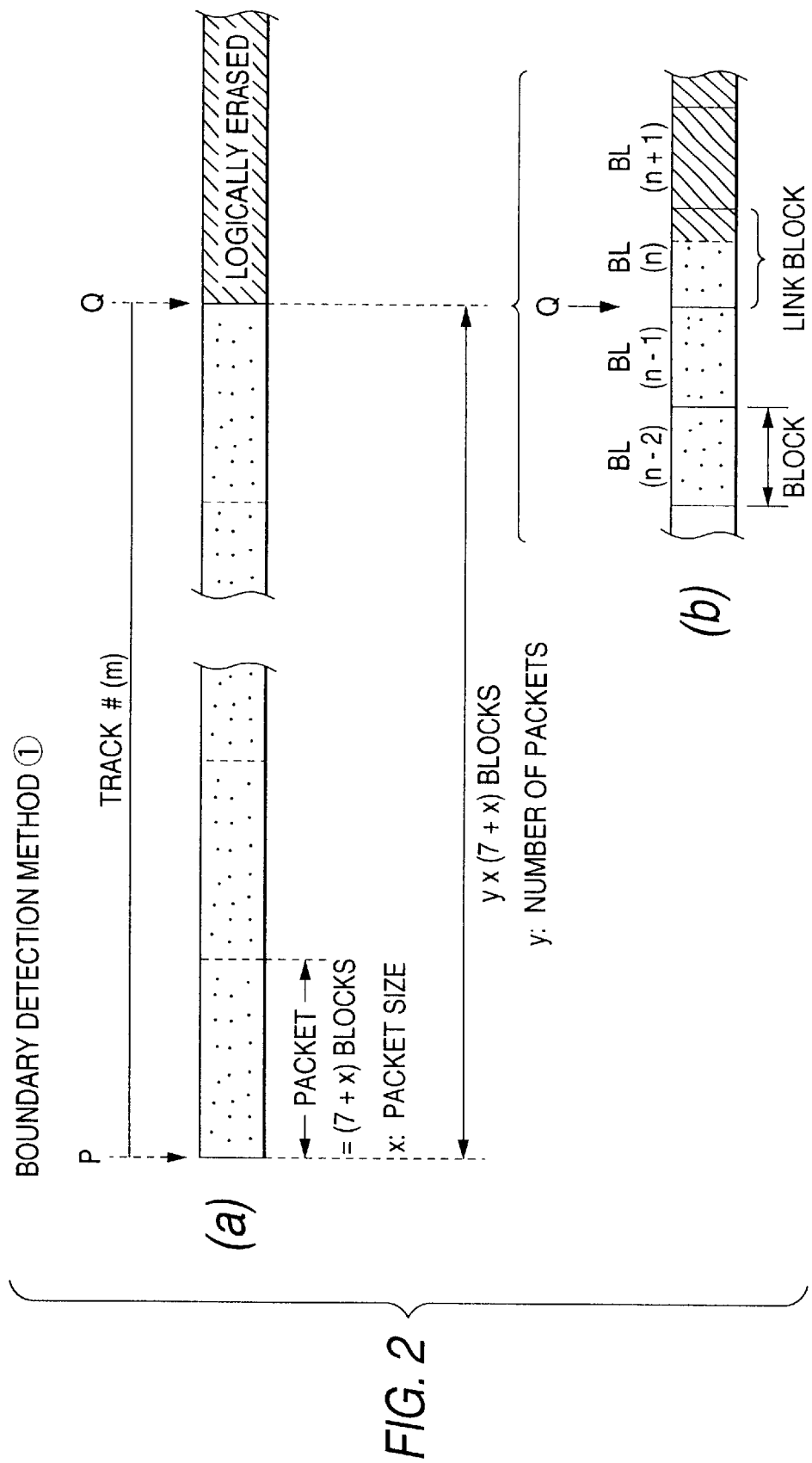
FIG. 2 is an explanatory diagram of a boundary detection method (according to the embodiment.
Figure 3:
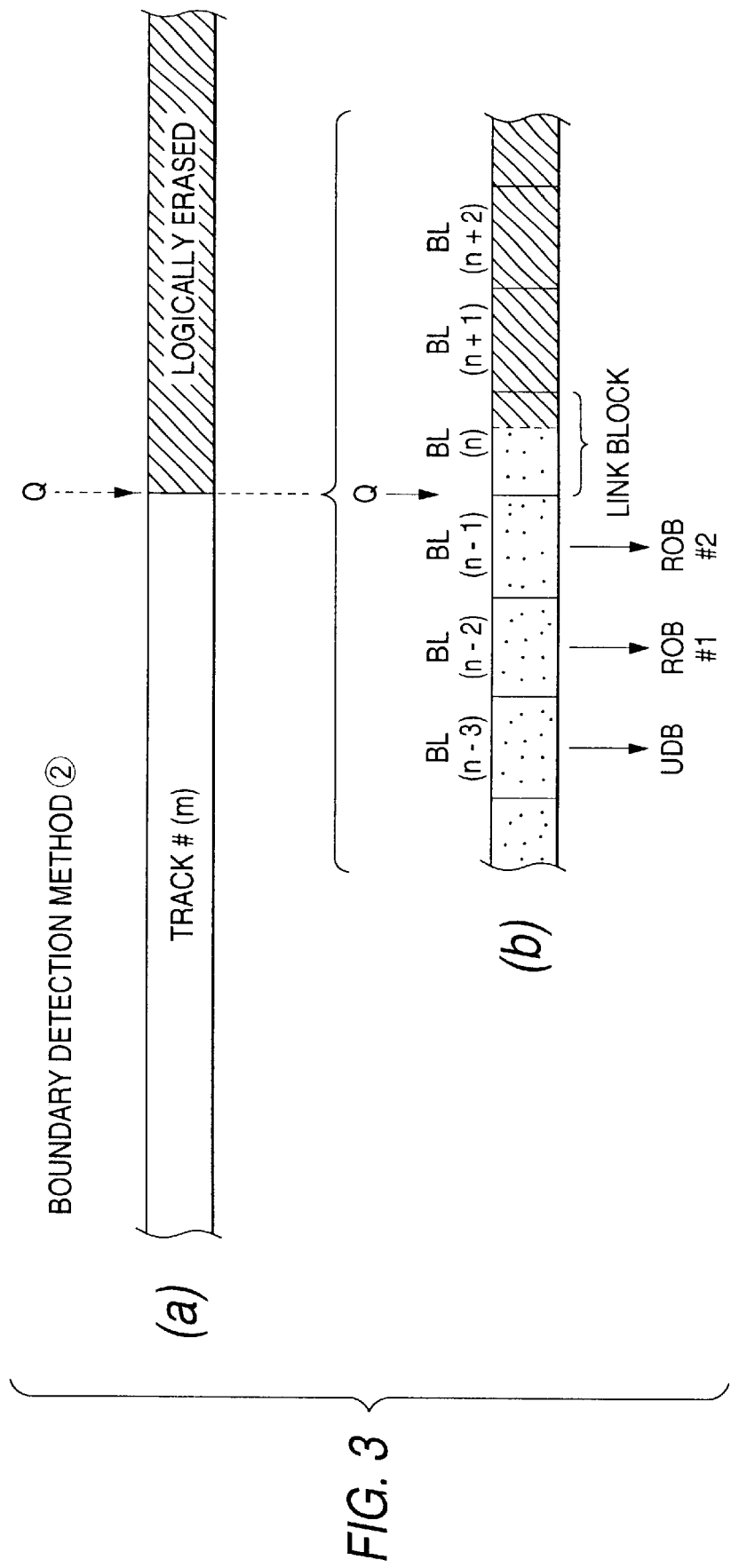
FIG. 3 is an explanatory diagram of a boundary detection method (according to the embodiment.

The boundary detection method in FIG. 2 is applied when recorded tracks #(m) (i.e., a track of a recorded portion as shown in FIG. 14(b)) are made up of fixed packets.

Where the track #(m) is constituted of fixed packets having a packet size x, each packet shown in FIG. 2(a) is formed by (7+x) blocks, that is, x user data blocks and seven other blocks (a link block, run-in blocks, and run-out blocks). If the track #(m) is formed by y packets, the total track length is y(7+x) blocks. That is, the block inmmediately after the data end Q of the track #(m) is necessarily located at a position that is distant from the track head P by an integral multiple of the packet length 7+x.

Assume that a block BL(n) is an actual boundary (the boundary portion is shown in FIG. 2(b) in an enlarged manner). Also, assume that a CRC error has been found in both of blocks BL(n–1) and BL(n). In this case, a block that is located at a position that is distant from the track head by an integral multiple of the packet length 7+x must be a boundary.

For example, assume that the address of the head block of the track #(m) is "100" and the packet length is 39 (=7+32) blocks. In this case, The address of the link block BL(n) should have a value that is an integral multiple of 39 with the address "100" as a reference, that is, 39z+100 (z: integer). If the block BL(n–1) has an address "177" and the block BL(n) has an address "178", the address of the block BL(n) satisfies the above formula and hence the block BL(n) must be a boundary.

Thus, when it is recognized based on the track descriptor (described above with reference to FIG. 5) that the track concerned is formed by fixed packets, the correct boundary can be determined through a calculation using the packet size. This method is used advantageously when fixed packets are used.

By contrast, the boundary detection method in FIG. 3 can be used irrespective of whether a recorded track #(m) (i.e., a track of a recorded portion as shown in FIG. 14(b)) consists of fixed packets or variable packets. This is because each packet constituting the track #(m) is formed by various blocks as shown in FIG. 6. In particular, because the last two blocks can be identified as run-out blocks ROB #1 and ROB #2.

For example, assume that a block BL(n) is an actual boundary (the boundary portion is shown in FIG. 3(b) in an enlarged manner). Also assume that a CRC error has been found in both of blocks BL(n−1) and BL(n). In this case, the block BL(n−1) can be recognized as the run-out block ROB #2 based on its header (see FIG. 7). Therefore, it can be determined that the block BL(n−1) is not a boundary and the next block BL(n) is the correct boundary.

Even in a hypothetical case in which the header of the block BL(n−1) cannot be read, it can be determined that the block BL(n−1) is not a boundary and the block BL(n) is the correct boundary if it is recognized that the preceding block BL(n−2) is run-out block ROB # 1.

Even where a CRC error is detected in both of the blocks BL(n−2) and BL(n), it can be judged that the block BL(n−2) is not a boundary and the second next block BL(n) is the correct boundary because it can be recognized based on the header of the block BL(n−2) that the block BL(n−2) is run-out block ROB #1.

In this manner, the boundary detection can be performed correctly by incorporating the block type into the judgment criteria.

In both of these methods, accurate boundary detection is enabled by using recorded information along with the detection of CRC errors, thereby increasing the reliability of the recording/reproducing system including the drive apparatus and the host computer 80.

Figure 4:
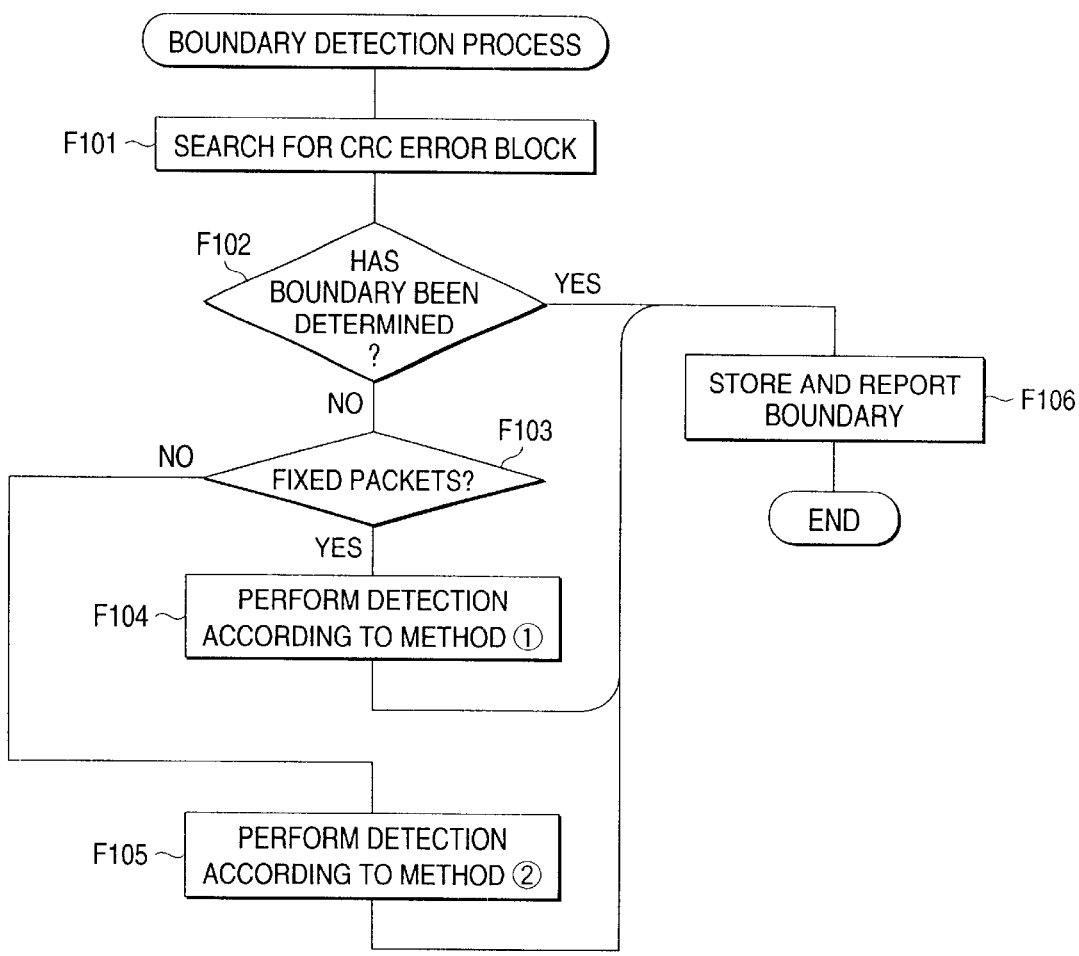
FIG. 4 is a flowchart of an example boundary detection process according to the embodiment.

The process outlined in FIG. 4 is a flowchart for using these boundary detection methods. First, at step F101. a reading operation is performed on the disc 90 and subcode CRC error states are checked. If only one CRC error block is detected in this step and that block is determined as a boundary, inquiry F102 is answered in the affirmative and the process advances to step F106, where the system controller 10 stores the boundary position and reports it to the host computer 80. By virtue of this, the host computer 80 can thereafter instruct a writing operation using the boundary position as a start position.

However, if no boundary was determined by the CRC error check at step F101, that is, if CRC errors occurred in a plurality of blocks, inquiry F102 is answered in the negative and the process advances to step F103, where it checks whether the track consists of fixed packets. As described above, this check can be done based on the track descriptor information. If the track consists of fixed packets, inquiry F103 is answered in the affirmative, and then at step F104 a boundary judgment is performed according to the first boundary detection method. That is, a block that is distant from the track head by an integral multiple of the packet length is selected from among the plurality of blocks where CRC errors occur to be the boundary. Since a boundary was correctly detected, the process advances to step F106, where the block position is stored and reported to the host computer 80.

If it is judged at inquiry F103 that the track does not use fixed packets, the process advances to step F105, where a boundary judgment is performed according to the second boundary detection method. Here, block types of the plurality of blocks where CRC errors occurred in the search at step F101 are recognized based on their headers and the boundary block is thereby determined. The process then advances to step F106, where the boundary position is stored and reported to the host computer 80.

Although in this example the second boundary detection method has been described as being used when the track does not use fixed packets, this method may also be used when the track is made up of fixed packets.

As is apparent from the above description, according to the invention data reading is performed on a recording medium on which data is recorded in the form of one or a plurality of packets formed of blocks, with each packet having a particular packet length, and a block where a reading error has occurred and that is located at a position distant from the track head by an integral multiple of the particular packet length is determined to be a boundary between a data-recorded region and a writable region. With this measure, in a recording medium on which data is recorded with a particular packet length, a boundary as mentioned above can be detected correctly and hence the reliability of subsequent operations can be increased.

Since a reading error state is not the only detection criterion, a boundary can be determined correctly even in recording media in which a reading error is prone to occur at a position other than a boundary such as a recording medium in which the signal quality is deteriorated due to a number of overwrite operations, or a recording medium having a stain or a scratch.

According to another aspect of the invention, data reading is performed on a recording medium on which data is recorded in the form of one or a plurality of packets formed of blocks, and a boundary between a data-recorded region and a writable region is determined by using a reading error state and the block type as criteria. Here, data is recorded on a packet-by-packet basis, each packet being prescribed so as to include a particular type of block, one of which may be an end block. Therefore, a boundary can be determined by detecting an end block, whereby the reliability of subsequent data recording operations can be increased.

Also in this case, since boundary detection does not depend on only a reading error state, a boundary can be determined correctly even in recording media in which a reading error is prone to occur at a position other than a boundary, such as a recording medium with deteriorated signal quality or a recording medium having a stain or a scratch.

Although the drive apparatus has been described according to a preferred embodiment, the configuration of the drive apparatus, the process for boundary detection, etc. is not limited to the examples described herein. Various modifications are possible. Also, while the drive apparatus described herein was explained in relation to CD-RW technology, the technology with which this invention is useful is not limited to CD-RW. For example, the invention can be applied to drive apparatus which use other rewritable recording media whose recorded data structure is similar to that explained herein.

Although certain preferred embodiments of the invention have been described in detail with reference to the accompanying drawings, it is to be understood that the present invention is not limited to those precise embodiments, and that many changes and modifications could be effected therein by one skilled in the art without departing from the spirit and scope of the invention as defined in the appended claims.

It is also to be understood that the following claims are intended to cover all of the generic and specific features of the invention herein described and all statements of the scope of the invention which, as a matter of language, might be said to fall therebetween.

What is claimed is:

1. A drive apparatus for recording data on and/or reproducing data from a recording medium in which said data is recorded in packets in a track, with each packet formed by a plurality of blocks, comprising:

a data reproducer for reproducing data from the recording medium;

an error detector for detecting an error in a block reproduced by said reproducer; and a boundary detector for determining a boundary between a data-recorded region on which data is recorded and a recordable region on which new data may be recorded, said boundary detector being operable, when the data is recorded on said recording medium in the form of one or a plurality of packets having a fixed packet length, to determine said boundary as a function of a position of a block where said error has occurred and a position distant from a track head by an integral multiple of the fixed packet length;

wherein said recordable region may be a logically erased region and whereby the boundary between the data-recorded region and the recordable region is correctly determined when the recordable region is a logically erased region.

2. The drive apparatus according to claim 1, wherein said recording medium includes information on a packet type of each packet and further comprising a packet type detector for detecting said packet type of each packet.

3. The drive apparatus according to claim 1, further comprising a packet length detector for detecting a packet length based on packet length information reproduced from said recording medium.

4. The drive apparatus according to claim 1, wherein said error detector is a CRC error detector.

5. A drive apparatus for recording data on and/or reproducing data from a recording medium on which data is recorded in packets, each packet being formed of a plurality of blocks and the last two blocks in the packet are end type blocks, comprising:

a data reproducer for reproducing data from the recording medium;

an error detector for detecting an error in a block reproduced by said reproducer;

a block type detector for detecting a block type of each block based on block type information reproduced from said recording medium; and a boundary detector for determining a boundary between a data-recorded region on which data is recorded and a recordable region on which data may be recorded, as a function of a detected error and said detected block type;

wherein said recordable region may be a logically erased region and whereby the boundary between the data-recorded region and the recordable region is correctly determined when the recordable region is a logically erased region.

6. A drive apparatus capable for recording data on and/or reproducing data from a recording medium in which said data is recorded in packets in a track, with each packet formed by a plurality of blocks, comprising:

a data reproducer for reproducing data from the recording medium;

an error detector for detecting an error in a block reproduced by said reproducer;

a packet detector for detecting the type of packet based on packet information reproduced from said recording medium;

a block type detector for detecting a block type of each block based on block type information reproduced from said recording medium; and a boundary detector for determining a boundary between a data-recorded region on which data is recorded and a recordable region on which new data may be recorded, said boundary detector being operable to determine the boundary by a first detecting method when the packets have a fixed packet length, and to determine the boundary by a second detecting method when the packets have a variable packet length;

wherein said recordable region may be a logically erased region and whereby the boundary between the data-recorded region and the recordable region is correctly determined when the recordable region is a logically erased region.

7. The drive apparatus according to claim 6, wherein said first detecting method determines the boundary as a function of a position of a block where said error has occurred and a position distant from a track head by an integral multiple of the fixed packet length.

8. The drive apparatus according to claim 6, wherein said second detecting method determines the boundary as a function of a detected error and said detected block type.

9. The drive apparatus according to claim 6, wherein said recording medium includes packet type information for detecting the type of packets in each track.

10. The drive apparatus according to claim 6, wherein said recording medium contains separate tracks of packets having a fixed length and packets having a variable length, respectively.

11. The drive apparatus according to claim 6, wherein the last two blocks in the packet are end type blocks.

12. The drive apparatus according to claim 6, wherein said recording medium is an optical disk.

13. A method for detecting a boundary between a recorded region on which data is recorded and a recordable region on which new data may be recorded, said regions being disposed in a track on a recording medium in which data is stored in fixed length packets and each packet is formed by a plurality of blocks, comprising the steps of:

reading data from said recorded region of the recording medium;

detecting an error in said data and determining a block within which said error occurred;

calculating the position of said block containing said detected error from a track head on said recording medium; and determining whether said block contains said boundary as a function of whether said block is located an integral multiple of fixed length packets from said track head;

wherein said recordable region may be a logically erased region and whereby the boundary between the data-recorded region and the recordable region is correctly determined when the recordable region is a logically erased region.

14. The method according to claim 13, wherein said recording medium is an optical disk.

15. A method for detecting a boundary between a recorded region on which data is recorded and a recordable region on which new data may be recorded, said regions being disposed on a recording medium in which data is stored in packets and each packet is formed by a plurality of blocks with each block being identifiable from among a plurality of block types, with the first block of each packet being the only block of a link block type, said method comprising the steps of:

reading data from said recorded region of the recording medium;

detecting an error in said data and determining the block and block type within which said error occurred; and determining said boundary if the detected error occurs in a block of said link block type;

wherein said recordable region may be a logically erased region and whereby the boundary between the data-recorded region and the recordable region is correctly determined when the recordable region is a logically erased region.

16. The method according to claim 15, wherein said plurality of block types further includes an end block type, with the last two blocks of each packet being the only blocks of said end block type, and said boundary being determined if the detected error occurs in a block following two end blocks.

17. The method according to claim 16, wherein said recording medium is an optical disk.

18. A method for detecting a boundary between a recorded region on which data is recorded and a recordable region on which new data may be recorded, said regions being disposed in a track on a recording medium in which data is stored in packets of respective formats, each packet being formed by a plurality of blocks with each block being identifiable from among a plurality of block types with the first block of each packet being the only block of a link block type, said method comprising the steps of:

reading data from said recorded region of the recording medium;

detecting an error in said data and determining the block containing said error;

detecting the format of said packets;

detecting the block type of said block containing said error; and determining said boundary by a first process when said format of said packets is fixed length and by a second process when said format is variable length, wherein:
said first process determines said boundary as a function of the error containing block being located an integral multiple of fixed length packets from a track head; and
said second process determines said boundary as a function of the detected error occurring in a block of said link block type;

wherein said recordable region may be a logically erased region and whereby the boundary between the data-recorded region and the recordable region is correctly determined when the recordable region is a logically erased region.

19. The method according to claim 18, wherein said recording medium includes information for detecting the format of packets in a track.

20. The method according to claim 18, wherein said recording medium contains separate tracks of packets having a fixed length and packets having a variable length, respectively.

* * * * *